May 23, 1933.   C. L. HEISLER   1,910,246
VARIABLE PITCH PROPELLER
Filed March 24, 1931   3 Sheets-Sheet 1

Inventor:
Charles L. Heisler,
by Charles E. Mullan
His Attorney.

May 23, 1933. C. L. HEISLER 1,910,246
VARIABLE PITCH PROPELLER
Filed March 24, 1931 3 Sheets-Sheet 2

Inventor:
Charles L. Heisler,
by Charles E. Mullan
His Attorney

Patented May 23, 1933

1,910,246

UNITED STATES PATENT OFFICE

CHARLES L. HEISLER, OF SCHENECTADY, NEW YORK, ASSIGNOR TO GENERAL ELECTRIC COMPANY, A CORPORATION OF NEW YORK

VARIABLE PITCH PROPELLER

Application filed March 24, 1931. Serial No. 524,900.

This invention relates to propellers and more particularly to aircraft propellers and has for an object the provision of a simple, reliable and efficient device for varying the pitch of the propeller blades during the flight.

A further object of the invention is the provision of a pitch changing device of minimum weight so arranged on the hub as not to necessitate any substantial increase in the usual distance between the hub and the engine casing and consequently no material increase in the overhanging weight on the motor shaft.

A still further object of the invention is the provision of a pitch changing device, the structure and hub connections of which are so arranged that the device may be easily and readily attached to the hub or removed therefrom for repair or replacement without disassembling the propeller itself.

In carrying the invention into effect in one form thereof a pitch-changing mechanism is mounted on the side of the hub farthest from the motor and this mechanism is actuated by power derived from the motor shaft under the control of a suitable control device mounted between the propeller hub and the motor.

The invention also comprises a compact and rugged pitch changing controller in which the position of a movable braking member located between the hub and the motor and actuated by the pilot serves to govern the extent of operation of the pitch changing mechanism.

In still another aspect the invention comprises a pitch-changing mechanism in which the arrangement of the parts inherently constitutes a mechanical follow-up of the movable controller member; i. e., the extent of the pitch-changing operation depends upon the amount of movement of the braking member of the controller.

For a better and more complete understanding of the invention reference should now be had to the following specification and to the accompanying drawings in which.

In illustrating the invention in one embodiment thereof I have shown it as installed upon an aircraft propeller hub having but two blades and mounted forwardly of the motor. It will be understood however that the invention may as readily be applied to propeller hubs having more than two blade sockets and also to propellers mounted rearwardly of the motor and acting as pushing propellers.

Referring now to the several figures of the drawings which illustrate a preferred construction of the invention, an aircraft such for example as an airplane is driven by means of a propeller having blades 10 and 11, the root ends of which are suitably secured in a hub member 12. The propeller is rotated in the usual manner by any suitable driving means such as the usual internal combustion engine or motor (not shown) through the casing 13 of which projects the motor shaft 14 upon which the hub member 12 is fastened by any suitable fastening means.

Power for adjusting the pitch of the propeller, i. e. turning the blades 10, 11 about their longitudinal axis 15—15 is derived from the motor shaft 14, when the propeller is rotated, by means of friction discs 16 and 17 rotatably supported on the hub member 12 and a cooperating stationary but adjustable friction brake collar 18 carried on the engine casing 13. The power so derived is transmitted through either of the shafts 19 or 20 (depending upon which of the discs 16, 17 is engaged by the braking collar 18) reduction gearing 21, and the screw jacks 22 and 23 to the connecting links 24, 25 so that a torque is applied to the blades which turns the blades about the blade axis 15. The degree of pitch adjustment of the blades is controlled by the position of the braking collar 18 on the motor shaft; the position of the braking member in turn being controlled by means of a suitable combined pitch indicator and controller 26. The friction disc 16 when engaged by the collar 18 serves to apply torque to the blades in such a direction that it will effect a change of pitch in a given direction, e. g. to decrease the pitch whilst on the other hand the disc 17 when engaged by the collar 18 serves to effect a change of pitch of the blades in the opposite direction, i. e., to increase the pitch.

Figure 2:
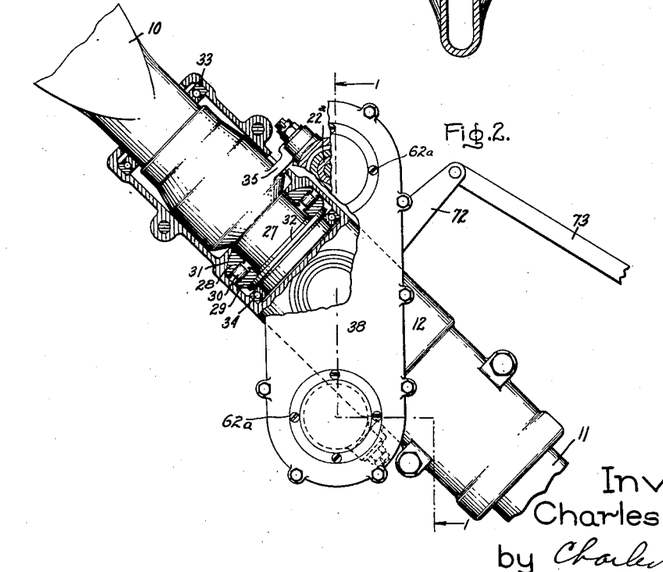
Fig. 2 is a front elevation of the device of Fig. 1 taken partly in section on the line 2—2 of Fig. 1 looking in the direction of the arrows with a portion of the mechanism housing members broken away to reveal the rotatable blade mounting in the propeller hub.

The inner or root ends of the blades 10 and 11 are respectively formed with reduced diameter or neck portions 27 so as to provide annular spaces between the blade roots and the interior surface of the hub 12 for suitable roller bearings. The roller bearing for the root of blade 10 is shown in Fig. 2 as comprising annular upper and lower races 28 and 29 respectively and a plurality of cooperating annularly arranged rollers 30. The upper race 28 abuts against an inside thrust flange 31 formed in the hub 12 and the lower race 29 is arranged to cooperate with a bearing flange 32 removably secured to the root end of blade 10. As thus constructed and arranged this bearing serves in an effective manner to resist the centrifugal thrust acting along the blade axis 15—15 when the propeller is rotated at high speed. The usual upper and lower ball race bearings 33 and 34 respectively are provided and these bearings transmit to the hub member 12 any forces acting approximately at right angles to the blade axis 15—15 and therefore serve as guide bearings for the rotation of the blades about this axis.

Similar ball and roller race bearings (not shown) are provided in the hub 12 for the blade 11.

A boss or blade adjusting arm 35 is formed on the root of blade 10 in such a manner that it may be conveniently coupled to the pitch-changing mechanism by the coupling links 24 so as to turn the blade about the axis 15—15 when the pitch-changing mechanism is actuated. The root of blade 11 is similarly provided with a boss or pitch-changing arm 36 coupled to the pitch-changing mechanism by means of the coupling link 25.

The pitch-changing mechanism is mounted on the hub 12 so as to rotate therewith and is mounted on the forward side of the hub, i. e. the side of the hub which is farthest from the motor and adjacent the end of the motor shaft 14 so that access to the pitch-changing mechanism for the purpose of repair or replacement may easily be had. The stationary but adjustable braking collar 18 which cooperates with the friction discs 16 and 17 to actuate the pitch-adjusting mechanism forms part of the control that is preferably mounted between the hub 12 and the motor and is attached to the engine casing 13. This control member 18 is adapted to move axially with respect to the motor shaft into frictional engagement with one or the other of the friction discs 16, 17 and the amount of its movement serves to determine the amount of change in the pitch of the blades 10, 11.

For the purpose of facilitating removal and replacement of the pitch-changing mechanism, the latter is mounted in a split movable casing or housing comprising parts 38 and 39 disposed on the side of the propeller hub farthest from the motor adjacent the end of the motor shaft and as shown it is supported by means of the pair of brackets 40 and 41 and the diametrically opposite disposed pair of brackets 42 and 43. These pairs of brackets 40, 41 and 42, 43 securely fasten the stationary quill jack-screw members $22_a$ $23_a$ to the hub 12 on opposite sides thereof; these quill jack-screw members $22_a$, $23_a$ being disposed parallel with and at equal distances from the motor shaft. As is clearly shown in Fig. 5 the quilt jack-screws $22_a$, $23_a$ are respectively provided with flanges 44, 45 which are adapted to abut against the faces of brackets 40 and 42 respectively. A lock nut 46 holds the flange 44 in abutting relationship with bracket 40 and thus serves to removably fasten the jack-screw $22_a$ to the bracket 40 whilst a similar lock nut 47 maintains flange 45 in abutment against the face of bracket 42 and thus removably secures the quill jack-screw $23_a$ to the hub 12. The threaded portion of quill jack-screw $22_a$ projects outwardly from a pair of brackets 40, 41 and engages with and supports the jack nut $22_a$ formed in the hub of the jack gear 48. It will also be observed that this jack-screw $22_a$ provides internal bearings for the gear or pinion shaft 19 to which the friction disc 16 is secured, the bearing so formed providing for both axial and rotative movement of the pinion shaft. Likewise it will be seen that the threaded portion of quill jack-screw $23_a$ projects outwardly from bracket 42 so as to engage and support the jack nut $23_b$ formed on the hub of jack gear 49. This jack-screw $23_a$ also provides internal bearings for the gear or pinion shaft 20 upon which the friction disc 17 is secured; this internal bearing providing for both axial and rotative movement of the pinion shaft 20.

A pinion 50 is attached to the outer end of the shaft 19 just beyond the point where this shaft projects through the threaded end of the jack-screw 22$_a$, and a similar pinion 51 is fastened to the outer end of shaft 20 just beyond the point where this shaft projects through the threaded end of jack-screw 23$_a$. It will be clear from the drawings that the pinion shafts 19 and 20 and quill jack-screws 22$_a$ and 23$_a$ respectively pass on opposite sides of the hub and perpendicularly through the plane of rotation of the propeller. The pinion 50 meshes with a speed reduction gear 52 having a small pinion 52$_a$ formed on its hub and arranged to mesh with the jack gear 48 for the purpose of rotating the jack nut 22$_b$ so as to cause the latter to move outwardly in an axial direction along jack-screw 22$_a$ when the disc 16 is engaged by the braking collar 18. Due to the large gear reduction between the pinion shaft 19 and the jack nut 22$_a$ the screw jack 22 is able to exert a large torque.

Similarly the pinion 51 on pinion shaft 20 meshes with a speed reduction gear 53 having a pinion 53$_a$ formed on its hub and arranged to mesh with the jack gear 49 so as to rotate the jack nut 23$_b$ and to cause the latter to move inwardly in an axial direction when the friction disc 17 is engaged by the braking collar 18. The reduction gearing between the pinion shaft 20 and the screw jack 23 insures large torque and powerful moving capacity of the latter.

As shown the divided housing 38, 39 provides journal bearings for the jack nuts 22$_b$, 23$_b$ on diametrically opposite sides of the motor shaft 14 and also on opposite sides of the propeller hub. It is also arranged to provide bearings for the reduction gear train comprising the gears 50, 52, 52$_a$, and 48 and also for the gear train comprising gears 51, 53, 53$_a$ and 49. In this connection it will be observed that the gear 52 and the integral pinion gear 52$_a$ formed on its hub rotates about the bearing pin 54 which is secured to housing member 39 by means of the internal flange 54$_a$ and the external nut 54$_b$, whilst the gear 53 and the integral pinion 53$_a$ are likewise rotatably mounted upon a bearing pin 55 secured to the housing member 39 in a similar manner. The jack gear 48 and its integral jack nut 22$_b$ are journaled in housing member 39 by suitable combination sleeve and ball race bearings 56 and 57, the ball races being provided for taking the thrust between the jack nut and the housing member. The jack gear 49 and the integral jack nut 23$_b$ are also journaled in housing 39 by means of similar combination sleeve and ball race bearings 59 and 60 respectively.

In order to insure rotative balance the like gears of each pair are disposed equally distant from the motor shaft axis 14 on opposite sides of the hub and mounted in a like manner in the housing. It will be observed that the speed reducing gears 52 and 53 are arranged to mesh with each other and thus provide simultaneous rotation of all gears, pinion shafts and friction discs when either of the friction discs 16, 17 is engaged by the braking collar 18. It will also be clear from the gearing arrangement shown that both friction discs 16 and 17 rotate in relatively opposite directions when one or the other of these discs is engaged by the collar 18; the instantaneous direction of rotation of either disc depending of course upon which of the discs is engaged by the stationary braking collar 18. It will also be observed that the threads of the jack-screws 22$_a$ and 23$_a$ are opposite handed, i. e., right and left handed respectively and as a result the pair of symmetrically disposed jack nuts 22$_b$ and 23$_b$ will both operate simultaneously and move together in the same direction to move the entire pitch changing mechanism including the housing 38, 39 which is carried on the jack nut 22$_b$, 23$_b$ toward or away from the hub member 12 depending of course upon which of the discs 16, 17 is engaged by the brake collar 18.

As has previously been pointed out in this specification, the pinion shafts 19 and 20 are respectively journaled in the quill jack screws 22$_a$, 23$_a$ in such a manner as to provide both for rotative and axial movement of the pinion shaft. Axial movement of the shaft 19 is governed by any suitable resilient means such for example as the spring 61, the outer end of which abuts against the spring cap 62 that is fastened to the housing member 38 by any suitable fastening means such as the screws 62$_a$. The inner end of spring 61 abuts with a predetermined resilient spring compressive force against a non-rotating flanged spring collar 63 which is axially and normally positioned by contact with an annular flange 38$_a$ formed integrally with housing member 38. The pinion 50 and a washer 64 fixed on the shaft 19 engage the spring collar 63 in a manner to provide for free rotation of the latter as well as an outwardly spring resisted axial movement of the pinion 50 and the pinion shaft 19 when the retarding brake collar 18 is actuated into engagement with the side of the disc 16 nearest the motor so as to apply a pressure thereto in an axial direction.

In a similar manner axial movement of pinion shaft 20 is opposed by a coil spring 65 and since the friction disc 17 which drives shaft 20 is adapted to contact with the brake collar 18 on the inner side thereof, i. e., the side farthest from the hub, it is necessary to reverse the action of spring 65, i. e., it is necessary to arrange the spring 65 to resiliently oppose an inward axial movement of the pinion shaft 20 toward the motor side of the hub. In order to provide this necessary reverse action, a cup-shaped flange spring collar 66 is rotatably secured on pinion shaft 20 by means of a washer 67 and a lock nut $67_a$ in such a position that the collar rests against the spring cap 68. The spring 65 is arranged in the space between this collar and an annular flanged portion $38_b$ of housing member 38 so that it forces the collar outwardly against the cap 68. The pinion 51 and the washer 67 both engage the spring collar 66 on opposite sides thereof, as shown, so as to provide for free rotation of the pinion shaft relative to the collar and also an inwardly spring resisted axial movement of the shaft 20 and pinion 51 when the inner side of the fixed disc 17 is engaged by the friction brake collar 18. It will thus be seen that the springs 61 and 66 serve as a cushioning means and thus prevent the pitch-changing mechanism from jamming when the braking collar 18 is suddenly actuated into engagement with one or the other of the friction discs 16, 17.

Although for the sake of simplicity only two friction discs 16, 17 have been shown, persons skilled in the art will understand that the number of friction discs coupled to the screw jacks may be increased as desired.

It will be clear from the above description of the pitch-changing mechanism and the manner in which it is separably connected to the hub member 12 that in order to remove the same from the hub members it is only necessary to remove the friction disc 16, 17 from the pinion shaft 19, 20, unscrew the lock nuts 46, 47 and disconnect the separable connecting links 24, 25 from the housing member 39. The entire pitch-changing mechanism may thereupon be removed simply by pulling it forwardly in an axial direction with respect to the motor shaft 14 so that the jack screws $22_a$, $23_a$ slide through the brackets 40, 41 and 42, 43 respectively. Thus, the pitch-changing mechanism may be bodily removed as a unit from the hub without disassembling the propeller or even removing it from the motor shaft, which feature greatly facilitates the repair or replacement of the pitch-changing mechanism with a proportionate saving in the time required for either of these operations.

The control mechanism for governing the operation of the pitch-changing mechanism is preferably disposed between the propeller hub 12 and the engine casing 13. As shown, a flanged and helically slotted sleeve cam 69 is fastened to the engine casing 13 by any suitable fastening means, e. g., the screws 70. This sleeve cam is snugly disposed concentrically about the motor shaft to save weight and conserve space. The slotted sleeve cam 69 projects a sufficient distance outwardly and telescopically over a portion of the hub 12 nearest the motor thereby providing a sufficient bearing of minimum weight for a concentric, cooperating sleeve member 71 to which the brake collar 18 is suitably attached. The brake collar is shown fastened to the sleeve 71 by screws $71_a$ so that it may be removed and replaced when worn out.

A radially projecting arm 72 is formed on the sleeve member 71 and is coupled at its outer end by means of the gear rack link 73 to a pinion 74 formed on the end of a light rotatable indicator shaft 75 that is supported on the aircraft and extends to any position convenient for the pilot where it is connected by any suitable coupling means to the pitch setting indicator and controller 26.

The sleeve member 71 is provided with hardened pins 76 which project radially inwardly and engage with the corresponding helical cam slots 77 in the sleeve cam 69. These cam slots 77 are preferably of steep pitch, i. e., they are arranged to make an angle of between 30° and 45° with the axis of the motor shaft so as to provide rapid axial movement of sleeve member 71 and braking member 18 when the former is given movement of rotation. It will be observed that slots 77 are opened at their ends farthest from the motor, as shown, for the purpose of providing easy removal of the sleeve 71 and brake member 18. This may be accomplished after removal of the hub 12 from the motor shaft simply by disconnecting arm 72 from link 73 and imparting a left-handed twisting motion to the brake collar 18. In assembling the brake member the above simple action is reversed.

From the above description it will be clear that a predetermined partial rotation of the control shaft 75 will oscillate the sleeve 71 on the sleeve cam 69 in such a manner as to cause the brake collar 18 to move axially with respect to the motor shaft a corresponding predetermined amount in one direction or the other and thus effect engagement with one or the other of the friction discs 16 or 17, depending of course upon the direction in which the shaft 75 is rotated.

The combined blade pitch-setting indicator and controller 26 is preferably disposed within convenient sight and reach of the pilot in any one of the several most desirable locations in the cab. It may be coupled by any well-known means utilizing light shafting, gears or wire connections to one or more pitch-changing controllers similar to braking member 18 and mounted on corresponding propellers and motor shafts of an aircraft. A crank may be substituted for the rack 73 and pinion 74 when intermediate pitch settings are not required.

In the pitch indicator and controller 26 shown in the drawings a threaded shaft 78 is suitably journaled for rotation in the upright members 79$_a$ and 79$_b$ of an oblong-shaped open frame 79. A divided nut 80 is threaded to engage the threads of shaft 79 and the upper and lower horizontal members 79$_c$ and 79$_d$ of the frame serve to slidingly guide the axial movement of the nut along the shaft 78 when the latter is rotated by means of the crank 81 with which it is provided. This shaft 78 is connected to drive the control shaft 75 of the pitch-controlling mechanism by any suitable driving means such for example as the worm member 82 with which shaft 78 is provided and the cooperating worm wheel 83 is provided on a control shaft 75. For convenience in changing pitch while in darkness by count of the number of turns of the crank 81, the worm ratio and the ratio between pinion and racks 74, 75 are preferably so chosen that one turn of the crank corresponds to one degree change in the setting of the propeller blade pitch. It will be obvious of course that any other desired ratio may be employed.

The upper horizontal member 79$_c$ of the frame 79 is provided with graduated markings corresponding to the degrees of blade pitch setting. A slide 86 engages the horizontal frame member 79$_c$ and as shown it is provided with a pointer 87 adapted to cooperate with the graduated markings 85. Two adjusting screws 88, 88$_a$ are respectively clamped to this slide by the small screws 89, 89$_a$. These adjusting screws are arranged in a manner to contact with the nut 80 after it has moved axially a short predetermined distance which corresponds with the amount of lost motion in the control and pitch-changing mechanism. The indicator slide 86 is given sufficient frictional engagement with the horizontal frame member to prevent all movement of the slide 86 except, that due to the forcible contact of the split nut 80 with one or the other of the adjusting screws 88, 88$_a$.

This indicator is adjusted to give precise readings corresponding to the propeller blade settings in the following manner: With the propeller rotating the indicator crank 81 is first turned through several degrees of pitch setting sufficient to insure having taken up all lost motion and wear in the pitch-changing mechanism between the crank 81 and the propeller blades 10 and 11. The propeller is then stopped and the usual markings provided on the hub and blades are examined to note the precise degree of blade setting and one or the other of the adjusting screws 88, 88$_a$ is adjusted until the pointer 87 of the slide indicates the corresponding reading on the graduation 85. The propeller is again started and the crank 81 given several turns in the opposite direction after which the propeller is stopped and readings of the blade setting on the hub are again taken. Then the other adjusting screw is adjusted until the pointer 87 gives precisely the same reading on the graduated markings 85 as the readings noted on the hub markings. Both settings should then be checked by repeating the operations outlined above to insure proper adjustment of the slide and indicator readings. Obviously the space between the adjusting screw end and the split nut will after proper setting correspond to the amount of movement of the slide necessary to take up lost motion in the pitch changing mechanism between the crank 81 and the propeller blades 10 and 11.

After making the above adjustments the indicator crank 81 should be turned in opposite directions several times to insure full freedom and absence of jamming while the pitch changing mechanism is being moved through its full range as indicated by the graduated markings.

When the proper operation has been ascertained the crank 81 should then be turned to place the nut 80 in an extreme position at one end of its travel. A spacing collar 90 is then inserted to fill the space between the nut 80 and the corresponding frame end 79$_a$. This operation is repeated with the nut 80 at the opposite end of its travel and a similar spacing collar 91 is inserted to fill the excess space. These spacing collars are provided to make it impossible to jam or injure any part of the pitch setting apparatus and instead to provide a simple stopping means which is located within sight of the pilot and within feel of the handle of the indicator crank 81.

Figures 3, 4:
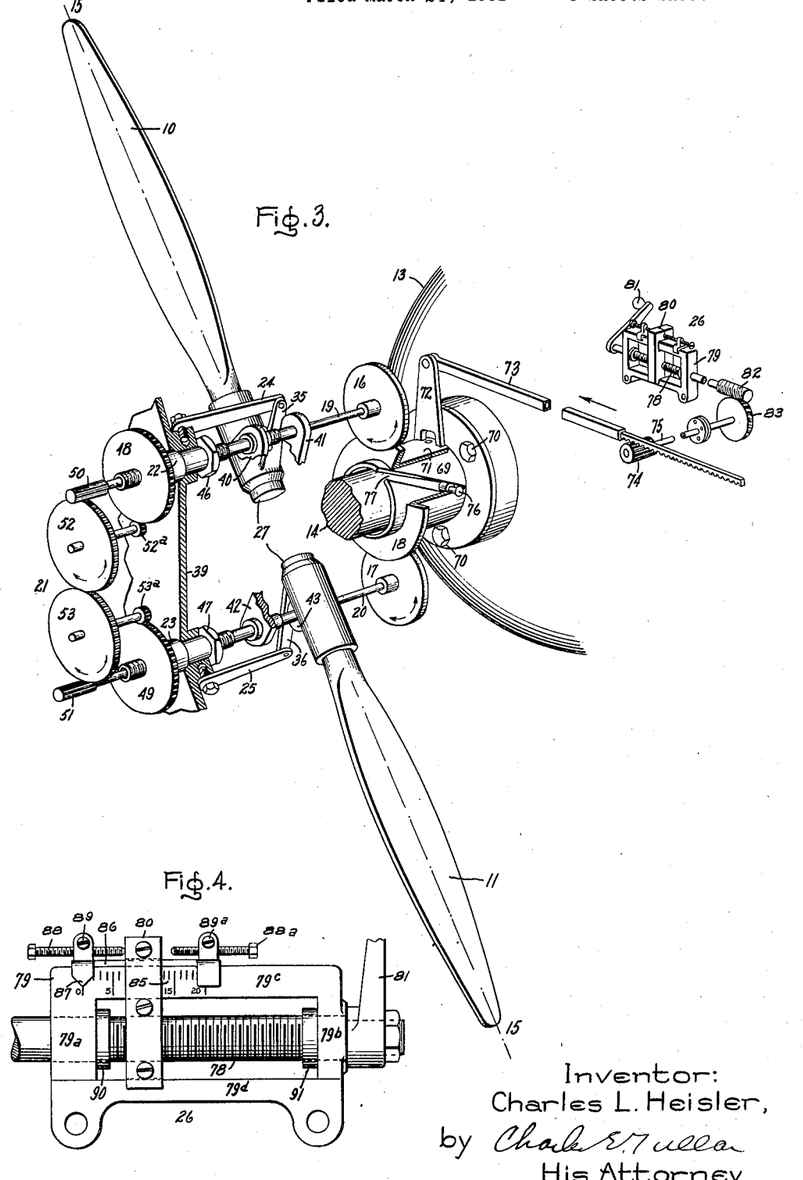
Fig. 3 is a perspective view of the more essential parts of the invention and arrangement thereof; the propeller hub being omitted and other parts broken away for the sake of clearness.
Fig. 4 is an enlarged elevation of the pitch setting indicator which is shown in perspective at the right of Fig. 3

With the above understanding of the elements of the pitch-changing device and associated control and their arrangement, the operation of the device will be readily and easily understood from the description which follows: In order to change the pitch of the propeller blades 10, 11 while the airplane is on the ground, or in flight, and with the propeller being rotated by the motor, the indicator crank 81 is given a number of turns by the pilot corresponding to the number of degrees of the desired change in the pitch of the blade. Assume that it is desired to change the pitch of the blade, e. g. reduce the pitch thereof from 10° to 5°. The crank 81 is rotated by the pilot until the pointer 87 (which it will be assumed is at the 10° marking) coincides with the 5° marking. This rotation of the crank 81 and shaft 78 will cause the worm 82 to drive the worm wheel 83 and effect rotation of the pinion 74. The rack link 73 will be actuated in response to rotation of the pinion 74 in a direction indicated by the arrow in Fig. 3, thus effecting relative rotation between the sleeve 71 and the slotted sleeve cam 69. The movement of rotation between the sleeve 71 and the sleeve cam 69 causes the sleeve 71 to move in an outward axial direction along the motor shaft 14 and thus to advance the braking member 18 into engagement with the friction disc 16.

As the brake member 18 engages the disc 16 the pinion shaft 19 upon which the friction disc is mounted is also given an outward axial movement which outward axial movement is opposed by the coil spring 61, thereby preventing any jamming in the mechanism in the event that the braking collar 18 is actuated into engagement with the friction disc 16 more rapidly than it should be. The engagement between the braking collar 18 and the friction disc 16 tends of course to retard the motion of the latter which is rotating with the hub 12 about the axis of motor shaft 14 and this retardation effects rotation of the pinion shaft 19 as well as pinion 50 which is secured thereto. Rotation of pinion 50 effects rotation of jack gear 48 through the reducing gear 52 meshing with the pinion 50 and hub pinion $52_a$ meshing with the jack gear 48. Since the jack nut $22_b$ is an integral part of the jack gear 48, the nut will be caused to rotate relative to the jack-screw $22_a$ and consequently cause it to move in an outward axial direction on the jack-screw $22_a$. In a similar manner the pinion 50 acting through gears 52 and 53 which mesh with each other will effect rotation of the jack nut $23_b$ but in an opposite direction to the direction of rotation of jack nut $22_b$. However, since the jack-screw $23_a$ and jack nut $23_b$ are oppositely threaded with respect to jack-screw $22_a$ and jack nut $22_b$, the jack nut $23_b$ will be caused to move in the same axial direction as that in which the jack nut $22_b$ is caused to move, which is to say in an outward axial direction.

Since the housing 38, 39 is borne on the jack nuts $22_b$, $23_b$, the housing 38, 39 together with the entire mechanism supported therein will be bodily moved as a unit in an outward axial direction along with the jack nut. This outward motion of the housing member will likewise cause the connecting links 24, 25 which are secured to the housing member 39, as shown, to move in an outward axial direction and thus to turn the propeller blades 10, 11 about the longitudinal blade axis 15—15 in a direction to decrease their pitch.

Figure 1:
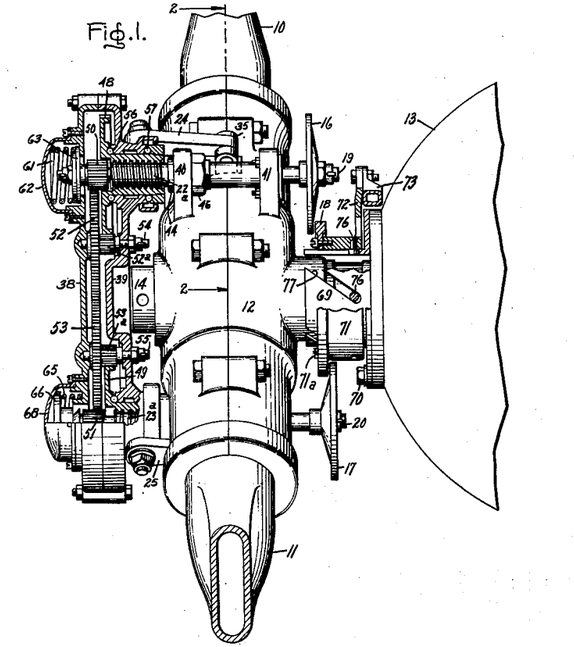
Fig. 1 is a side elevation partly in section of my improved pitch-changing mechanism as installed upon the hub of an aircraft propeller, the section being taken on the line 1—1 of Fig. 2 looking in the direction of the arrows.
Figure 5:
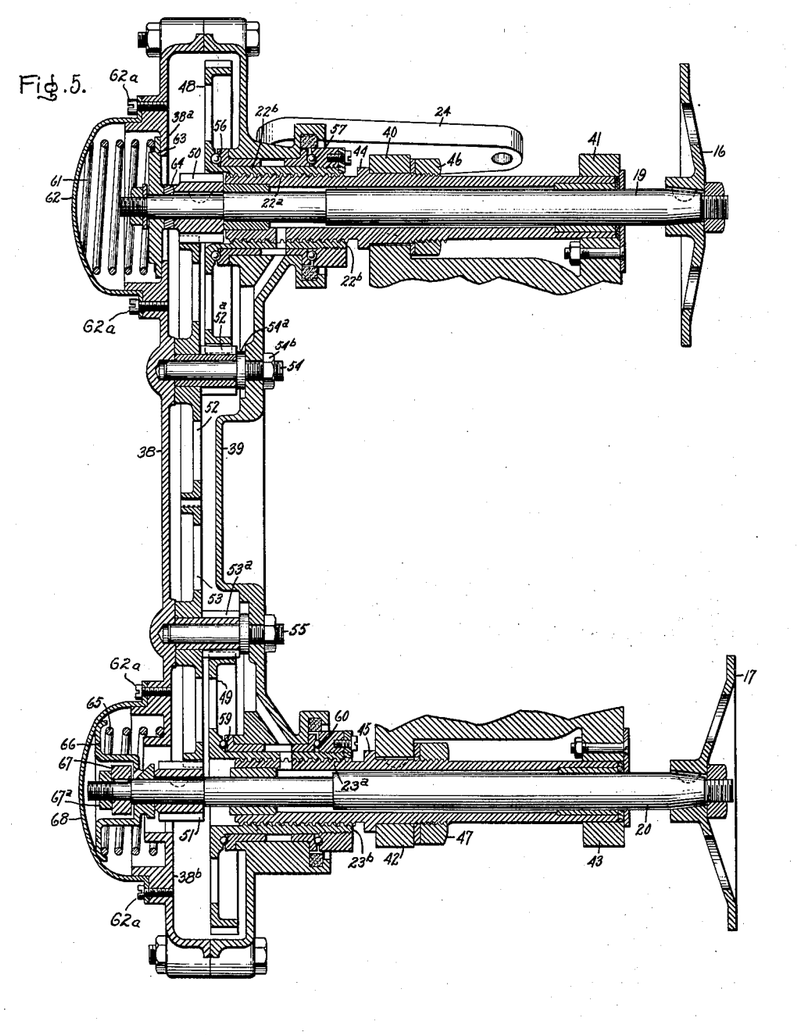
Fig. 5 is an enlarged sectional view of the pitch-changing mechanism of Fig. 1 clearly illustrating the details of the invention.

This movement will continue until the spring 61 again causes the flange collar 63 to come to rest in its normal position in which it is illustrated in Figs. 1 and 5 of the drawings, i. e., in contact with the annular flanged portion $38^a$ of the housing member 38.

It will thus be seen that the pitch of the blades 10, 11 is changed an amount that is proportional to the distance that the frictional braking collar 18 is advanced along the motor shaft and that consequently the pitch-changing mechanism constitutes an inherent mechanical "follow up" of the axial control movement of the brake collar.

The flywheel action of the friction discs and other rotating parts in the mechanism will cause a slightly additional movement of the jack-screws and thereby clear the friction wheel 16 from engagement with the brake collar 18 at which time the pitch of the propeller blades 10, 11 have been adjusted to the degree indicated by the pointer 87 on the graduated markings 85.

Persons skilled in the art will understand that if the controller crank handle 81 had been rotated in the reverse direction that the brake collar 18 would have been actuated in an inward axial direction into engagement with the friction disc 17 and that the ensuing operation would be exactly the reverse of that above described, i. e., the propeller blades 10, 11 would be rotated about the longitudinal blade axis 15—15 in a direction to increase the pitch thereof by an amount corresponding to the number of turns of the crank handle 81.

Although in accordance with the provisions of the patent statutes I have described the invention as embodied in concrete form I would have it understood that the invention is not limited to the exact form in which it is illustrated and described since alterations and modifications will readily suggest themselves to persons skilled in the art without departing from the true spirit of this invention or from the scope of the annexed claims.

What I claim as new and desire to secure by Letters Patent of the United States, is:

1. A variable pitch propeller comprising in combination, a hub adapted to be mounted upon a shaft with one side of the hub adjacent the end of the shaft, a plurality of blades rotatably mounted on said hub to provide for pitch adjustment thereof, means arranged on said side of said hub for varying the pitch of said blades, means mounted on the opposite side of said hub and actuated in response to rotation of said propeller for controlling said pitch varying means, and means mounting said pitch varying means on said hub and providing removal of said pitch varying means as a unit.

2. A pitch adjusting device for a propeller provided with a hub adapted to be mounted on a motor shaft and blades movably mounted for pitch adjustment on the hub, comprising means arranged on the side of the hub remote from the motor for changing the pitch of the blades, means mounted on the opposite side of the hub and responsive to rotation of the propeller for actuating said pitch changing means, and means mounting said pitch varying means externally on said hub and providing removal of said pitch varying means as a unit.

3. A variable pitch propeller comprising in combination, a hub member adapted to be mounted on a motor shaft with one side of the hub adjacent the end of the shaft, a plurality of blades rotatably mounted on the hub to provide for pitch adjustment thereof, mechanism arranged on said side of said hub for varying the pitch of said blades, connections securing said mechanism externally on said hub and providing unitary removal therefrom, friction means mounted on the opposite side of said hub and actuated in response to rotation of said hub for actuating said pitch changing mechanism and braking means arranged in cooperative relationship with said friction means for controlling the actuation of said friction means.

4. A pitch adjusting device for an aircraft propeller having a hub mounted on the motor shaft and having blades mounted for rotation with respect to the hub, said device comprising mechanism arranged on the side of the hub farthest from the motor for changing the pitch of the blades, braking means movably mounted between the hub and the motor, means for adjusting the position of said braking means in an axial direction with respect to the motor shaft, means actuated by rotation of the propeller responsively to adjustments in the position of said braking means for operating said pitch changing mechanism and connections mounting said mechanism on said hub providing unitary movement of said mechanism in an axial direction with respect to the motor shaft, and connections between said mechanism and said blades providing change of pitch of said blades responsively to said axial movement.

5. A pitch adjusting device for an aircraft propeller having a hub mounted on a motor shaft and having blades rotatably mounted on the hub, said device comprising control means having a braking member movably mounted between the hub and the motor and a cooperating sleeve cam member surrounding the motor shaft for effecting movement of said braking member in an axial direction with respect to the motor shaft, means mounted on the hub and movable in said axial direction by said braking member for changing the pitch of the blades responsively to said axial movement of said braking member, and means for cushioning the impact of said braking member on said pitch changing means.

6. A pitch changing device for an aircraft propeller having a hub mounted on the motor shaft and blades rotatably mounted for pitch adjustment on the hub, said device comprising a movable element for controlling the degree of pitch adjustment of the blades, means comprising a manually operated controller and a sleeve cam surrounding said motor shaft and operated by said controller for moving said element, and means responsive to the amount of movement of said element and actuated by rotation of the propeller for changing the pitch of said blades an amount proportional to the movement of said element, said last mentioned means comprising a shaft mounted on said hub for axial movement and provided with a driving member arranged for frictional engagement with said element, a spring arranged to be compressed by engagement of said element and said driving members to prevent jamming, and means for releasing the compression of said spring upon a rotation of said driving member proportional to the movement of said element.

7. A variable pitch propeller comprising in combination, a hub mounted on the motor shaft, blades rotatably mounted on said hub, control means having a braking member movably mounted between the hub and the motor and a cooperating sleeve cam concentrically disposed with the motor shaft for effecting movement of said braking member in an axial direction with respect to the motor shaft in response to relative movement of rotation between said cam and braking member, and means comprising a support mounted on the side of said hub farthest from the motor and reduction gearing mounted on said support and actuated by rotation of said hub for changing the pitch of the blades responsively to said axial movement of said braking member.

8. In an aircraft provided with a motor having a shaft extending outwardly from the craft, a propeller hub fastened to said shaft and rotated thereby, a plurality of propeller blades, means rotatably mounting said blades on said hub to provide for changing the pitch of said blades, control means comprising a braking member and a cooperating sleeve cam having helical slots extending to and opening at the edge of said sleeve nearest said hub and forming an angle of between 30° and 45° with the axis of said sleeve for effecting rapid axial movement of said braking member in response to relative movement of rotation between said member and said sleeve, and means comprising a gear box provided with reduction gearing mounted on the side of said hub farthest from the motor and actuated by rotation of said hub responsively to said axial movement of said braking member for changing the pitch of said blades.

9. In an aircraft provided with a motor having a shaft projecting outwardly from the craft, a propeller hub fastened to said shaft and rotated thereby, a plurality of blades, means rotatably mounting said blades on said hub to provide for pitch adjustment thereof, a control means comprising a sleeve member disposed concentrically with said shaft and provided with helical cam slots and a brake member provided with cooperating pins for engagement with said slots to effect axial movement of said brake member responsively to relative movement of said brake member and said sleeve member, and means comprising a gear box provided with reduction gearing mounted on side of the hub farthest from the motor and actuated by rotation of said hub in response to said axial movement of said brake member for changing the pitch of said blades.

10. Mechanism for adjusting the pitch of aircraft propeller blades in a propeller hub comprising a plurality of jack screws, each having a pair of cooperating relatively movable members, means for securing one of each of said pairs of members to said hub, a plurality of frictional driving members for effecting relative movement between the members of each of said pairs of jack-screw members, mechanical means for connecting one of each of said pairs of members to one of the blades to effect pitch adjustment thereof responsively to said relative movement, and speed reduction gearing between each of said frictional driving members and one of each of said jack-screws, all of said speed reduction gearings being coupled to each other to effect simultaneous operation of all of said jack-screws and simultaneous adjustment of all of the propeller blades when one of said frictional driving members is actuated.

11. In an aircraft propeller having a plurality of blades rotatably mounted in a hub on the motor shaft, a pair of shafts mounted on opposite sides of said hub for axial movement, a pair of oppositely disposed friction wheels one mounted on each of said shafts, a separate speed reducing mechanism connected to each of said wheels, means mounting said mechanisms on said hub and providing movement of both of said mechanisms as a unit in the same direction axially with respect to the motor shaft in response to actuation of one of said wheels, mechanical connections between said mechanisms and said blades for effecting pitch adjustment of said blades responsively to said axial movement, a brake member movably mounted between the hub and the motor arranged in cooperative relationship with said wheels, means for moving said brake member in opposite directions for selective actuation of said wheels, and springs associated with each of said wheels and arranged to be compressed by the engagement of its associated wheel and said brake member, said springs being mounted on said mechanisms so that the compression of said spring is relieved by said axial movement of said mechanisms.

12. In an aircraft propeller having a plurality of blades rotatably mounted upon a propeller hub on a motor shaft, pitch changing means for said blades comprising a plurality of driving shafts, bearing means on said hub providing both axial and rotational movement of said driving shafts, friction wheels for rotating said driving shafts and mechanical connections between said driving shafts and the blades, an adjustable control for said pitch changing means comprising a brake member movably mounted between the hub and the motor and means for moving said member into engagement with said friction wheels to effect rotation thereof, and cushioning means cooperating with said driving shafts to provide yielding engagement of said wheels and said brake member while changing blade pitch.

13. In an aircraft propeller having a propeller hub mounted on a motor shaft and blades rotatably mounted on the hub to provide for pitch adjustment thereof, pitch changing means for the blades comprising a plurality of jack-screws connected to the blades, a plurality of gear shafts, bearing means on the hub providing both axial and rotational movement of said gear shafts, an individual friction wheel secured to each of said gear shafts, braking means for selectively retarding said friction wheels and driving said gear shafts, speed reduction gears coupling said gear shafts with each other and to said jack-screws to effect simultaneous change in the pitch of the blades when one of said friction wheels is retarded, and resilient means for effecting yielding engagement of said friction wheels with said brake member and disengagement of said wheels from said brake member when said brake member is in normal non-pitch-changing position.

14. A pitch adjusting device for an aircraft propeller having a hub mounted on a motor shaft and provided with blades rotatably mounted on the hub, said device comprising a speed reducing mechanism mounted on the hub for axial movement as a unit with respect to said hub, means actuated by the motor shaft for driving said mechanism and bodily displacing said mechanism with respect to said hub, and means connecting said mechanism to the propeller blades to vary the pitch thereof responsively to said displacement.

15. A pitch-changing device for an aircraft propeller having a hub mounted on a motor shaft and having blades rotatably mounted on the hub, said device comprising mechanism arranged on the side of the hub farthest from the motor for varying the pitch of the blades, mechanical connections securing said mechanism on said hub and providing removal of said mechanism as a unit therefrom, actuating means for said pitch changing mechanism comprising a pair of frictionally driven shafts disposed on opposite sides of the hub parallel with the motor shaft and passing through the plane of the propeller rotation, bearing means rotatably mounting said shafts on the hub, and an adjustable control mounted between the hub and the motor shaft for controlling the operation of said driving means.

16. A variable pitch propeller comprising a hub mounted on a motor shaft, a plurality of blades, means rotatably mounting said blades on said hub to provide for pitch adjustment thereof, a pair of frictionally driven gear shafts, a pair of jack-screws each having a jack nut and a cooperating externally threaded quill jack provided with internal bearing for rotatably supporting one of said shafts, fastening means for securing said quill jacks to said hub, reduction gearing coupling said gear shafts to each other and to said jack nuts, a housing arranged on the side of the hub farthest from the motor and enclosing said jack-screws and reduction gearing, bearings in said housing supporting said reduction gearing, bearings formed in said housing for supporting said housing on said jack nuts and providing for movement of said housing with said jack nuts, connections between said jack-screws and said blades for changing the pitch thereof in response to operation of said gear shafts, and adjustable control means mounted between said hub and the motor for controlling the operation of said gear shafts.

17. A variable pitch propeller for an aircraft having a motor and a shaft projecting outwardly therefrom comprising in combination, a hub mounted on the motor shaft, a plurality of blades, means for rotatably mounting said blades on said hub to provide for pitch adjustment thereof, a pair of gear shafts, friction wheels actuated by rotation of said hub for driving said gear shafts, a pair of jack-screws each having a jack nut and a cooperating externally threaded quill jack forming an internal bearing for one of said gear shafts, means for fastening said quill jacks on said hub, reduction gearing coupling said gear shafts to said jack-screws and to each other to provide simultaneous operation of said jack-screws in response to rotation of one of said gear shafts, a housing member arranged on the side of said hub farthest from the motor for enclosing said reduction gearing and jack-screws, bearings formed in said housing supporting said reduction gearing, jack-screw bearings formed in said housing providing movement of said housing with said jack nuts, coupling means between said jack nuts and said blades for changing the pitch of the blades in response to rotation of one of said gear shafts, and an adjustable control device mounted between said hub and the motor for selectively actuating said gear shafts to provide for changing the pitch of said blades in opposite directions.

18. A pitch changing device for an aircraft propeller having a hub mounted on the motor shaft and blades rotatably mounted on the hub to provide for pitch adjustment thereof, said device comprising means arranged on the hub and actuated by rotation of the hub for varying the pitch of the blades and mechanical connections mounting said pitch varying means on said hub and providing movement of said pitch varying means as a unit in an axial direction with respect to the motor shaft, and additional connections providing change of pitch of said blades responsively to said axial movement, and an adjustable control device for said pitch varying means provided with safety stops for limiting the extent of operation of said pitch changing means.

19. A pitch changing device for an aircraft propeller having a hub mounted on the motor shaft and blades rotatably mounted on the hub to provide for pitch adjustment thereof, said device comprising in combination, means actuated by rotation of the propeller for varying the pitch of the blades, and a control device for said pitch changing means, said control device comprising supporting frame, a screw journaled for rotation in said frame, manually operated means for turning said screw, connections between said screw and said pitch changing means for controlling the operation of said pitch changing means, a nut engaging said screw, means restraining rotation of said nut and providing for movement thereof along said screw in response to rotation of said screw, a sliding member on said frame moved by said nut, adjustable means for governing the movement of the nut before engaging said sliding member to compensate for lost motion in said pitch changing means and control device, and limit stops between said nut and frame for preventing jamming of said pitch varying means and control device.

20. A pitch adjusting device for aircraft propellers having a hub and blades rotatably mounted on the hub to provide for pitch adjustment thereof, said device comprising means for varying the pitch of the blades and a control device for said pitch varying means, said control device comprising a screw, connections between said screw and said pitch varying means for controlling the operation of said pitch changing means, a nut engaging said screw, pitch markings on said frame, an indicator member moved by said nut and cooperating with said markings to give pitch readings, and adjustable means for coupling said indicator and said nut to compensate said reading for lost motion in said pitch varying means and control device.

In witness whereof I have hereunto set my hand.

CHARLES L. HEISLER.